(12) United States Patent
He et al.

(10) Patent No.: US 7,787,359 B2
(45) Date of Patent: Aug. 31, 2010

(54) METHOD AND SYSTEM FOR DATA FORWARDING IN LABEL SWITCHING NETWORK

(75) Inventors: Jianfei He, Shenzhen (CN); Chaogang Lu, Shenzhen (CN); Wei Fu, Shenzhen (CN); Xingque Quan, Shenzhen (CN); Xiaodong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 10/591,514

(22) PCT Filed: Jan. 28, 2006

(86) PCT No.: PCT/CN2006/000189

§ 371 (c)(1),
(2), (4) Date: Aug. 29, 2007

(87) PCT Pub. No.: WO2006/079293

PCT Pub. Date: Aug. 3, 2006

(65) Prior Publication Data

US 2008/0239969 A1     Oct. 2, 2008

(30) Foreign Application Priority Data

Jan. 29, 2005     (CN)     ......................... 2005 1 0009215

(51) Int. Cl.
*H04J 1/16*     (2006.01)
(52) U.S. Cl. ...................... 370/217; 370/474; 370/225; 370/242; 370/238; 370/476
(58) Field of Classification Search ........................ None
See application file for complete search history.

(56) References Cited

U.S. PATENT DOCUMENTS 6,788,686 B1 *     9/2004     Khotimsky et al. ......... 370/394

(Continued)

FOREIGN PATENT DOCUMENTS

CA     2 356 567     2/2003

(Continued)

OTHER PUBLICATIONS

International Search Report for PCT/CN2006/000189, mailed May 18, 2006.

(Continued)

*Primary Examiner*—Ayaz R Sheikh
*Assistant Examiner*—Faiyazkhan Ghafoerkhan
(74) *Attorney, Agent, or Firm*—Marshall, Gerstein & Borun LLP

(57) ABSTRACT

The present invention discloses a method for data forwarding used in label switching networks, with which, at the source node, sequence numbers are added to the data packets forming an original data flow to be forwarded according to the forwarding order, then the data packets are mapped to label switched paths (LSP) for forwarding; at the destination node, the data packets received from the LSPs are merged into the same data flow as the original data flow to be forwarded according to the order of the sequence numbers. Meanwhile, during the data forwarding in accordance with the invention, an alarm mechanism is used to detect a faulted LSP, and the mapping strategy is adjusted timely to avoid the massive loss of the data packets, which guarantees the security of the data forwarding to the greatest extent while a high bandwidth utilization ratio is ensured.

6 Claims, 3 Drawing Sheets

U.S. PATENT DOCUMENTS

| | | | |
|---|---|---|---|
| 6,859,842 B1* | 2/2005 | Nakamichi et al. | 709/238 |
| 6,956,821 B2* | 10/2005 | Szviatovszki et al. | 370/237 |
| 6,982,977 B2* | 1/2006 | Marian et al. | 370/392 |
| 7,046,669 B1* | 5/2006 | Mauger et al. | 370/393 |
| 7,092,361 B2* | 8/2006 | Puppa et al. | 370/242 |
| 7,126,907 B2* | 10/2006 | Carpini et al. | 370/218 |
| 7,151,775 B1* | 12/2006 | Renwick et al. | 370/400 |
| 7,170,869 B2* | 1/2007 | Yang et al. | 370/328 |
| 7,218,606 B2* | 5/2007 | Soumiya | 370/217 |
| 7,230,913 B1* | 6/2007 | Vasseur et al. | 370/216 |
| 7,296,177 B2* | 11/2007 | Johansson et al. | 714/4 |
| 7,327,675 B1* | 2/2008 | Goode | 370/230 |
| 7,467,226 B2* | 12/2008 | Luong et al. | 709/238 |
| 7,596,094 B2* | 9/2009 | Puppa et al. | 370/242 |
| 2002/0018452 A1 | 2/2002 | Cha | |
| 2002/0136230 A1* | 9/2002 | Dell et al. | 370/416 |
| 2003/0039208 A1* | 2/2003 | Soumiya | 370/216 |
| 2003/0043792 A1* | 3/2003 | Carpini et al. | 370/386 |
| 2004/0133368 A1* | 7/2004 | Johansson et al. | 702/58 |
| 2007/0189170 A1* | 8/2007 | Pirbhai | 370/237 |

FOREIGN PATENT DOCUMENTS

| | | |
|---|---|---|
| CN | 1336753 | 2/2002 |
| JP | 2004080251 | 3/2004 |
| WO | WO 02/05485 | 1/2002 |

OTHER PUBLICATIONS

Gao et al., "Delay-Based Adaptive Load Balancing in MPLS Networks," *IEEE*, 2:1184-1188 (2002).

Krishnan et al., "An Approach to Path-Splitting in Multipath Networks," *Proceedings of the International Conference on Communications*, 3:1353-1357 (1993).

Supplementary European Search Report for Application No. 06705610, dated Aug. 15, 2008.

* cited by examiner

METHOD AND SYSTEM FOR DATA FORWARDING IN LABEL SWITCHING NETWORK

CROSS REFERENCES TO RELATED APPLICATIONS

This application is the national phase of International Application No. PCT/CN2006/000189, which was filed on Jan. 28, 2006, and which, in turn, claimed the benefit of Chinese Patent Application No. 200510009215.0, which was filed on Jan. 29, 2005, the entire disclosures of which are hereby incorporated by reference.

FIELD OF THE TECHNOLOGY

The present invention generally relates to the label switching technology, and more particularly, to a data forwarding method and system in label switching networks.

BACKGROUND OF THE INVENTION

As a key technology in NGN, the label switching technology plays a more and more important role in IP networks. The label switching technology was initially put forward to raise the forwarding speed of routers, but is now widely used in traffic engineering, Virtual Private Network (VPN), Quality of Service (QoS), etc. owing to its own advantage, and increasingly becomes an important standard for large-scale IP networks.

In a label switching network, data packets are forwarded through label switching, and the forwarding path of the data packets in the label switching network is called label switching path (LSP), which is defined by swapping label values. The label values of the data packets are switched in each label switching router (LSR), which includes an Ingress LSR and an Egress LSR. As the label switching technology is becoming a key technique for the multi-service bearer in the IP networks, an efficient use of the limited bandwidth resources of the label switching network to realize data forwarding with protection has become the focus of concern in the telecommunication industry.

To realize the data forwarding with protection, the International Telecommunications Union(ITU) Y.1720 standard specifies two data forwarding methods on the existing packet switching networks including the label switching network: the 1:1 (One to One) mode and the 1+1 (One plus One) mode. Descriptions are hereinafter given, respectively, to the implementing principles of the two methods for the data forwarding in the label switching networks.

In the 1:1 mode two LSPs are provided for the same data flow for forwarding, which include a main LSP and a standby LSP. The main LSP is used in the normal state, and the standby LSP is, in a sense, a protection for the main LSP, which means that when the main LSP is working normally, the standby LSP is idle, and when the main LSP has a failure, the data flow would be switched to the standby LSP by the source end, i.e. the ingress LSR.

In the 1+1 mode, the same data flow is distributed to two LSPs at the source end, through which the flow is forwarded at the same time, and then the destination end, i.e. the egress LSR, selects one from the main and standby LSPs to receive the data flow.

SUMMARY OF THE INVENTION

A method for data forwarding in label switching network is provided to improve the bandwidth resource utilization ratio in data forwarding by label switching.

The method for data forwarding through label switching network, includes the following steps: at the source node, all the data packets forming the original data flow to be forwarded are distributed and mapped to multiple Label Switching Paths (LSPs) for forwarding; at the destination node, the data packets received from all the LSPs are merged into the same data flow as the original one to be forwarded.

A system for data forwarding in label switching network includes at least a service bearer logic layer and a basic network layer, wherein the service bearer logic layer includes at least a source node and a destination node; and the basic network layer includes multiple LSPs, wherein, the source node is configured to add a sequence number to each data packet forming an original data flow to be forwarded according to a forwarding order, and to map the data packets to more than one valid LSPs; the destination node is configured to merge the data packets received from the valid LSPs according to the order of the sequence numbers, and to remove the sequence numbers of the merged data packets to obtain the same data flow as the original data flow to be forwarded.

To sum up, in accordance with the invention, at a source node of the label switching network, all the data packets forming a data flow are distributed and mapped to a number of LSPs for a uniform forwarding; while at the destination node, the data packets received from each of the LSPs are merged into the same data flow as the data flow originally forwarded. In a specific embodiment of the invention, when the source node is forwarding the data packets, the sequence numbers are added to each data packet according to the forwarding order, then an orderly merging is conducted for the data packets received from each of the LSPs at the destination node and the same data flow as the original data flow forwarded is obtained. Because the data packets are forwarded together through a number of LSPs, the data forwarding load of each LSP is reduced, and the bandwidth utilization ratio of each LSP is improved. Moreover, during the data forwarding, the destination node could detect the faulted LSPs using an alarm mechanism, then sends the related information to the source node so that the source node could adjust the mapping strategy in time according to the received information, that is, identifying the corresponding LSP as invalid, stopping mapping the data packets to the LSP, and continuing the data forwarding through the valid LSPs left. As a result, a continuous loss of the data packets is avoided, the security of the data forwarding is guaranteed to the greatest extent while a high bandwidth utilization ratio is ensured.

EMBODIMENTS OF THE INVENTION

To make the scheme and advantages of the invention clearer, detailed descriptions are given to the invention with reference to the drawings as follows.

With regard to the 1:1 mode, since a standby LSP is needed as the protection of the main LSP and the standby LSP is idle in the normal state, the bandwidth utilization ratio is relatively low. Although the standby LSP could be used to forward other services in some cases, it is difficult to find out a service having the same source and the same destination as far as some flexible services are concerned. Therefore, the overall utilization ratio of the standby LSP is still low. With regard to the 1+1 mode, as it is necessary to forward two same data flows in the network at the same time, the bandwidth utilization ratio is low as well.

The essence of the invention is that: at the source node, the data packets forming the original data flow to be forwarded are distributed and mapped to a number of LSPs for forwarding to the destination node; at the destination node, the data packets received from the LSPs are merged into the same data flow as the original data flow forwarded.

Figure 1:
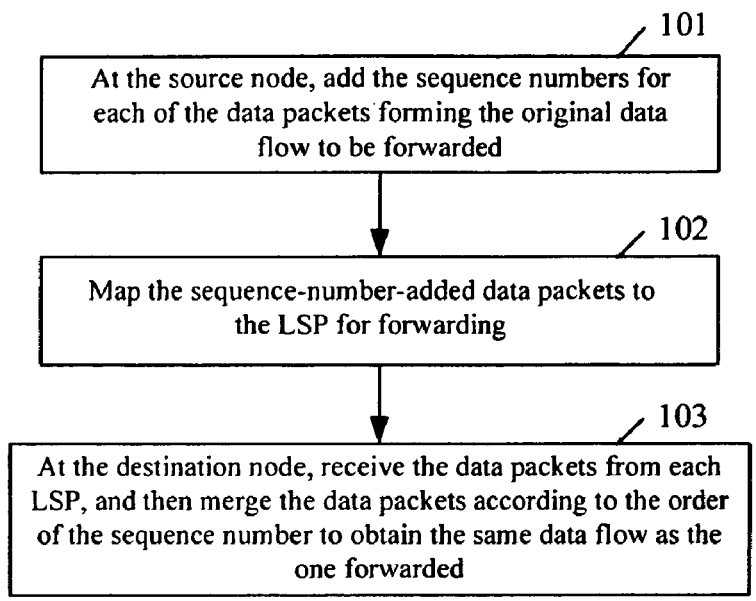
FIG. 1 is a flow chart of the data forwarding method in label switching network according to a preferable embodiment of the invention.

Detailed descriptions are hereinafter given to an embodiment of the method of the present invention in which the data are forwarded through a label switching network. As shown in FIG. 1, the method includes the steps of:

Step 101: At the source node, sequence numbers are added to each data packet forming the original data flow to be forwarded according to the forwarding order.

Wherein, the sequence number is the only identifier for the forwarding order of the data packets. And the sequence numbers added to the data packets to be forwarded first should be smaller than the ones for the data packets forwarded later. The sequence number could be added to a data packet by adding an identifier field in the frame header of the data packet.

Step 102: The sequence-number-added data packets are mapped to the valid LSPs for forwarding.

Figure 2:
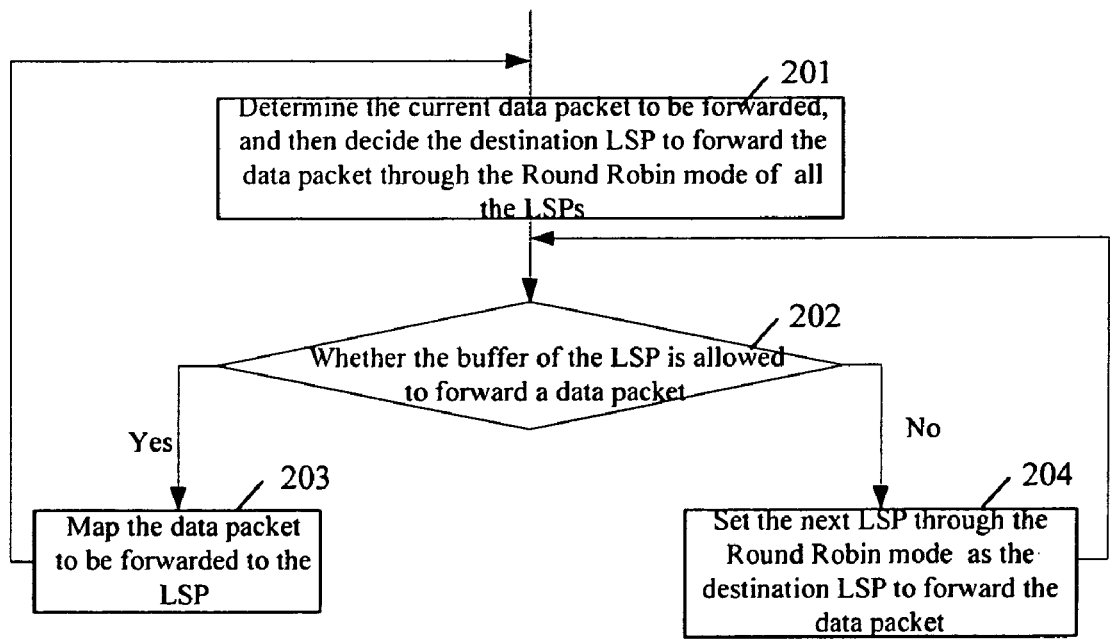
FIG. 2 is a flow chart for mapping the data packets to the LSPs for forwarding in the above preferable embodiment.

In the following, a detailed description is given to the process of mapping the data packets to the LSPs for forwarding. As shown in FIG. 2, the process includes the steps of:

Step 201: The data packet to be forwarded currently is identified according to the FIFO principle, and all the valid LSPs are inquired by the Round Robin mode to decide an LSP as the current destination LSP for the forwarding of the data packet.

The process of deciding the destination LSP by the Round Robin mode means that all the valid LSPs are inquired one by one in a certain order in a rotational way. For instance, suppose that there are altogether 3 valid LSPs, which are LSP 1, LSP 2 and LSP 3, respectively. In the first round, the LSP 1 could be inquired first, then the LSP 2, and then the LSP 3; the same order applies to the second round, and so on.

Step 202: if a data packet is allowed to be forwarded by a path buffer of the destination LSP, proceed to Step 203; otherwise, proceed to Step 204.

Step 203: The data packet is mapped to the LSP for forwarding, then go back to Step 201.

Step 204: The next LSP in the Round Robin mode is taken as the destination LSP for the data packet forwarding, then go back to Step 202.

In the above, Step 102 of the embodiment has been described. In the following, a description is given to Step 103 thereof.

Step 103: At the destination node, the data packets are received from each of the valid LSPs through Round Robin mode, and then are merged into a data packet sequence, or data flow, in the order of the sequence numbers of the received data packets. Then the sequence numbers of the data packets forming the data flow are removed, thus the same data flow as the original data flow forwarded is obtained.

Figure 3:
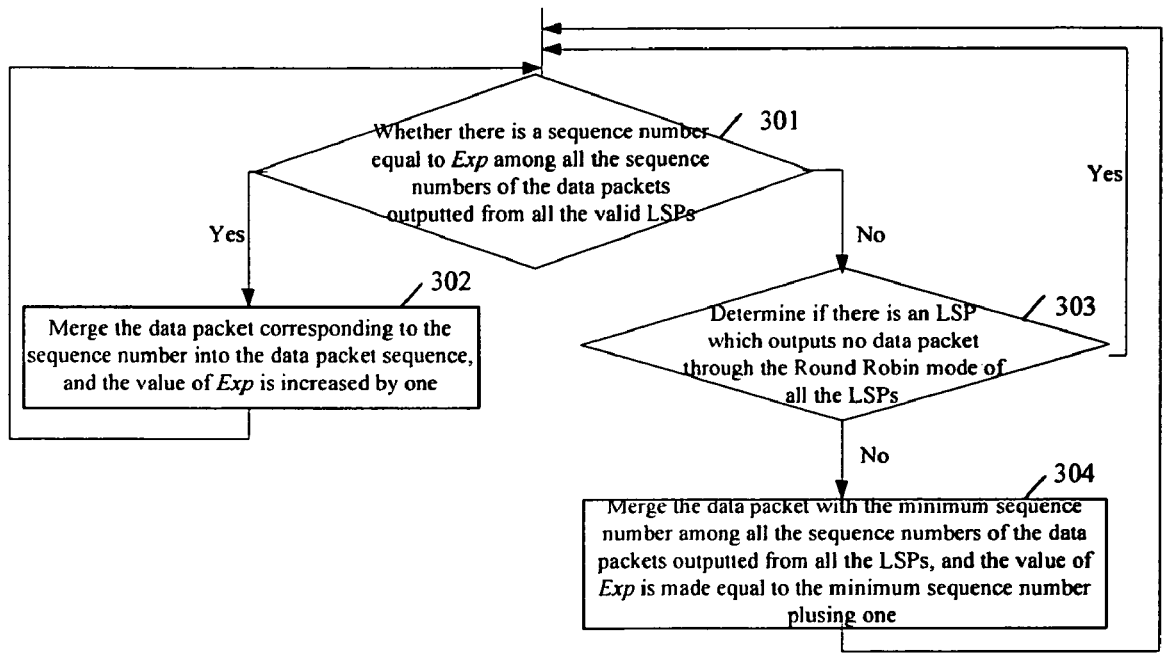
FIG. 3 is a flow chart for receiving and merging the data packets in the above preferable embodiment.

At the destination node, since it is necessary to merge all the received data packets forwarded through different LSPs to a data packet sequence according to the sequence numbers thereof, an LSP specially used to store the data packet sequence could be optionally set at the destination node, e.g. LSPc. Suppose that the sequence number of the data packet to be merged to the LSPc is a variable Exp, the initial value of which is the starting value of the sequence numbers added to the data packets to be forwarded at the source node. Then the following Step 301 to Step 304 could be adopted to implement the data packet receiving and merging described in the above Step 103, which, as shown in FIG. 3, are as follows:

Step 301: All the valid LSPs are inquired, if there is a sequence number equal to Exp among all the sequence numbers of the output data packets of the valid LSPs, proceed to Step 302; otherwise, proceed to Step 303.

Step 302: The data packet corresponding to the sequence number is merged into the data packet sequence in the LSPc, the Exp is increased by 1, then proceed to Step 301.

Step 303: If there is an LSP without outputting the data packets among all the valid LSPs in the Round Robin mode, proceed to Step 301; otherwise, proceed to Step 304.

Step 304: The data packet of which the sequence number is the minimum in the Round Robin mode is merged to the data packet sequence in the LSPc, and the value of Exp is assigned to be the minimum sequence number pulsing one, then proceed to Step 301.

In the Step 304 above, Bubble sort could be adopted for merging the data packet with the minimum sequence number to the data packet sequence, which specifically includes the following steps:

3041. Two LSPs are selected from all the valid LSPs randomly;

3042. The sequence numbers of the output data packets of the two LSPs are compared to decide the minimum value, if there is unselected LSP left, proceed to Step 3043; otherwise, proceed to Step 3044;

3043. An LSP is randomly selected from the unselected LSPs, the previously decided minimum value is compared with the sequence number of the output data packets of the selected LSP to decide the new minimum value, if there is unselected LSP left, proceed to Step 3043; otherwise, proceed to Step 3044;

3044. The data packet corresponding to the finally obtained minimum value is merged to the data packet sequence, and the process ends.

In the above steps, on one hand, there exists a wrap phenomenon in adding sequence numbers to the data packets at the source node, which means the sequence number would return to its initial value after being increased to the maximum value. For example, suppose that the sequence number used has 8 binary digits with the initial value being 1; when the value increases to $2^8-1$, it would return to 1 and then increases again, thus the range of the sequence number is $1 \sim 2^8-1$. Therefore, such a wrapping situation of the sequence numbers of the data packets should be taken into consideration when the destination node receives the data packets. On the other hand, as there is always more or less time delay and loss of packets in each LSP used for forwarding data packets, both the data packets lagging caused by time delay and data packet loss should also be taken into consideration for each of the LSPs when the destination node receives the data packets.

With all the above considered, the specific method adopted in the embodiment is: assuming the binary digits of the sequence number added at the source node are n; the number of potential data packets to be forwarded, is $\Delta D$, calculated by the maximum time delay of all the valid LSPs and the maximum continuous packet loss allowable in a working LSP among all the valid LSPs is $\Delta L$, then $\Delta D + \Delta L = \Delta A \leq 2^{n-1}$, where $\Delta A$ represents the number of the data packets calculated for the LSP with the largest time delay and largest continuous packet loss. The time delay could be converted to a number of data packets like this: multiplying the time delay of the LSP with the ratio of the valid bandwidth of the LSP to 8, then the product divided by the minimum packet length to obtain the number of the data packets needed. Herein, the unit for time delay is (s), the unit for the bandwidth is (bit/s), and the unit for the packet length is (Byte). If the calculation result is not an integer, the decimal part could be directly removed and then the result should be increased by 1. The minimum packet length is service specific, e.g. the minimum packet length of the data packets forwarding in Ethernet is 64 bytes.

In the following, detailed descriptions are given to the procedure of selecting the minimum value as mentioned in Step 3042 and Step 3043 above. First, suppose that the sequence numbers of the data packets received from the two LSPs at the destination node, LSPa and LSPb, are variables x and y, respectively.

Figure 4:
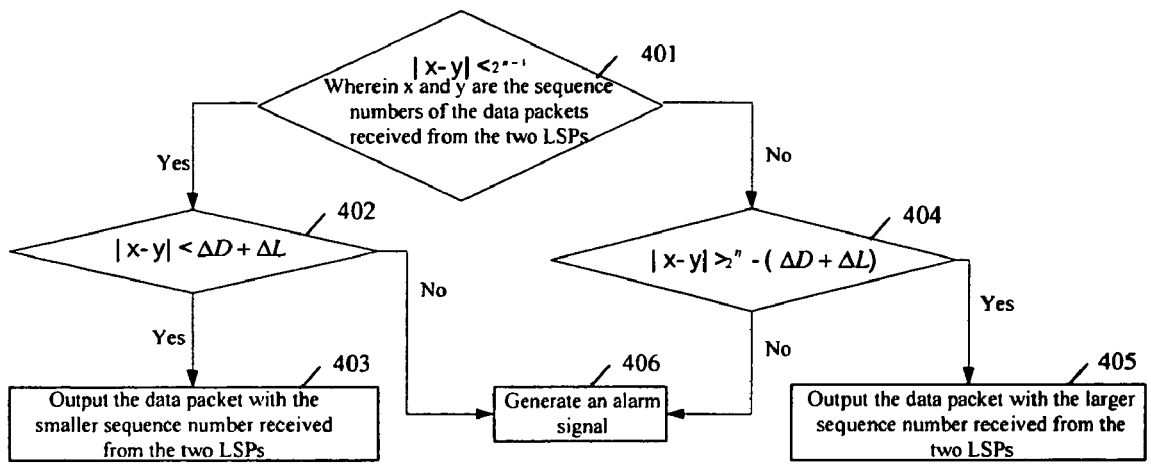
FIG. 4 is a flow chart for selecting the data packet with minimum sequence number from the output data packets of the two LSPs in the above preferable embodiment.

Then the steps for selecting the data packet with the minimum sequence number from the output data packets of the two LSPs, as mentioned in Step 3042 and Step 3043 above, include the following, as shown in FIG. 4:

Step 401: If $|x-y| \leq 2^{n-1}$, proceed to Step 402; otherwise, proceed to Step 404.

Step 402: If $|x-y| \leq \Delta D + \Delta L$, which means x and y are in the normal deviation range of the sequence number, proceed to Step 403; otherwise, proceed to Step 406.

Step 403: The minimum value of x and y is outputted, that is min(x,y), the comparison of pairs of values is ended and the procedure is terminated.

Step 404: If $|x-y| > 2^n - (\Delta D + \Delta L)$, proceed to Step 405; otherwise, proceed to Step 406.

Step 405: The max(x,y) is outputted, comparison of pairs of values is ended and the procedure is terminated.

Step 406: An alarm signal defect of "Loss of alignment" (dLOA) is generated to inform the operating people, and the procedure is terminated.

According to the method of the embodiment of the present invention, some other measures could be taken to guarantee the security of the data forwarding. The source node could insert a detection message to the data flow forwarded to the destination node according to a set period while the destination node receives the detection message from the LSPs according to the set period; when the detection message is found lost, the LSP will be identified as invalid, the information about the invalid LSP is forwarded to the source node, and the data receiving operation from the invalid LSP is stopped; when the source node receives the information, the data distribution to the invalid LSP is stopped. This is the method guaranteeing the security of data forwarding through the OAM. Apart from this method, some other methods specified by the ITU Y.1720, e.g. forward defect identifier (FDI), could be adopted as well to guarantee the security of data forwarding.

Figure 5:
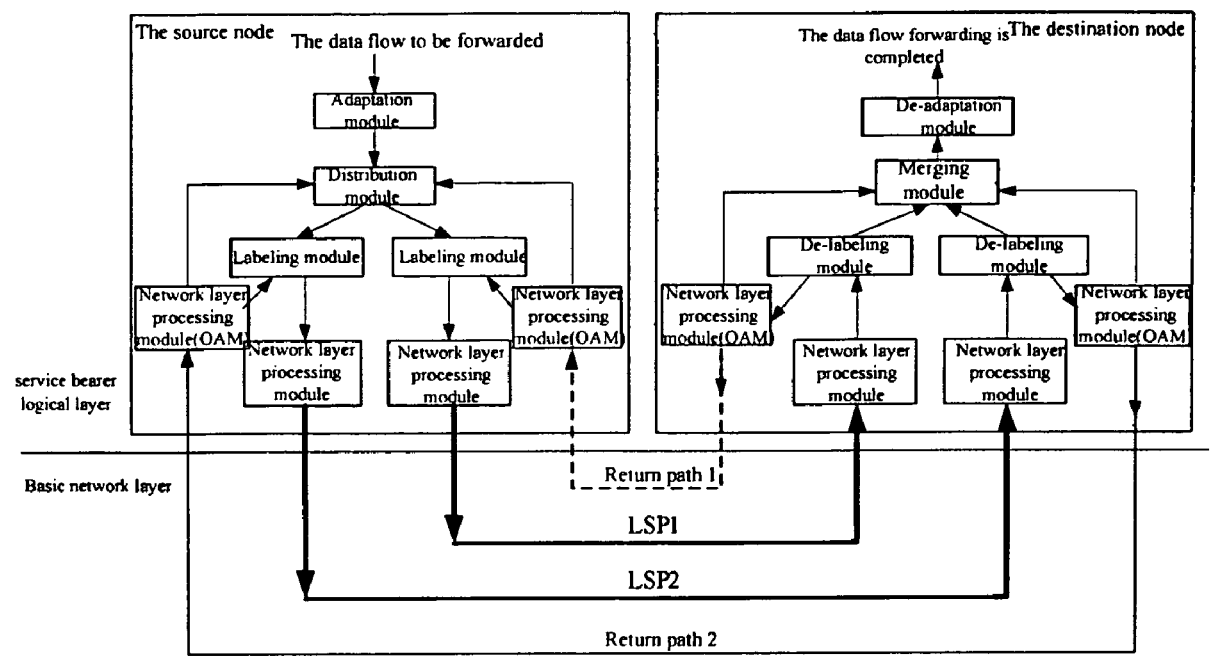
FIG. 5 is a schematic diagram illustrating the structure of the data forwarding system in label switching network according to a embodiment of the present invention.

The method for data forwarding through label switching network in accordance with the embodiment of the present invention has been described in the above, then the system structure for such forwarding is described in the following. As shown in FIG. 5, the system at least includes a service bearer logic layer and a basic network layer, where the service bearer logic layer at least includes a source node and a destination node. The source node, which typically means the Ingress LSR, is used to add a sequence number to each data packet forming the original data flow to be forwarded according to the forwarding order, and to distribute and map the data packets to the LSPs on the basic network layer. The destination node, which typically means the Egress LSR, is used to de-map the data packets received from the valid LSPs and merge them into a data packet sequence according to the order of the sequence number, and to remove the sequence numbers of the merged data packets or the data flow so as to obtain the same data flow as the original data flow forwarded. The basic network layer including more than one LSP (two LSPs are included as shown in the Figure) used as the bearer of the data packets for forwarding, which could be a Synchronous Digital Hierarchy (SDH) or an Ethernet, etc.

Specifically speaking, the source node could include an adaptation module, a distribution module, labeling modules corresponding to each of the LSPs of the basic network layer, and a network layer processing module. Wherein, the adaptation module is configured to add sequence numbers to the data packets forming the same data flow according to the forwarding order, and send the sequence-number-added data packets to the distribution module; the distribution module is used to distribute the received data packets to the labeling modules; the labeling module is used to add labels to the received data packets and send the label-added data packets to the network layer processing module; the network layer processing module is used to map the data packets to the basic network layer for forwarding.

Correspondingly, the destination node could include: network layer processing modules and de-labeling modules corresponding to each of the LSPs in the basic network layer, a de-adaptation module and a merging module. The network layer processing module is used to de-map the data packets received from the basic network layer, and send the de-mapped data packets to the corresponding de-labeling module; the de-labeling module is used to remove the labels from the received data packets; the merging module is used to merge the data packets received from each de-labeling module according to the order of the sequence number into a data packet sequence/data flow; the de-adaptation module is used to remove the sequence numbers from the merged data packets and obtain the same data flow as the original data flow forwarded.

Although in FIG. 5, there are two LSPs, and correspondingly 2 labeling modules and 2 network layer processing modules at the source node, and 2 de-labeling modules and 2 network layer processing modules at the destination node, the embodiment of the present invention is obviously not confined to this configuration, the number of the LSPs and corresponding modules could be more than 2 according to the practical demands of the network forwarding.

Moreover, to guarantee the security of data packet forwarding in the LSPs, the basic network layer could also include one or more return paths. And the source node in the service bearer logical layer could also include OAMs corresponding to each LSP. The OAM is connected with the labeling module of the corresponding LSP and is used to insert a detection message into the data flow in the labeling module according to a set period, and to forward the failure indication to the distribution module upon receiving the failure indication of the LSP sent by the destination node through a corresponding return path. At this time, the distribution module mentioned above is also used to stop distributing the data packets to the labeling module corresponding to the LSP upon receiving the LSP failure indication sent by OAM;

Correspondingly, the destination node in the above mentioned service bearer logical layer also includes the OAMs corresponding to each LSP. The OAM is connected with a corresponding de-labeling module and is used to receive the detection message from the de-labeling module according to the set period, to send an LSP failure indication to the OAM corresponding to the source node through the return path when no detection message is received within the set period, and to inform the merging module; the merging module is used to stop receiving the data packets from the LSP after receiving the information from the OAM.

The method and system for data forwarding according to the embodiments of the present invention has been described as above. The embodiments of the present invention is applicable not only to common multi-protocol label switching (MPLS) systems, but also to modified general multi-protocol label switching (GMPLS) systems as well as Ethernet and etc. The label switching concept in the embodiments of the present invention refers to the networks to which the label switching or the G label switching is applicable, including but not limited to the Ethernet, the label switching networks and etc.

To sum up, the foregoing are just preferable embodiments of the invention, which are not used for limiting the protection scope thereof.

The invention claimed is:

1. A method for data forwarding in label switching networks, comprising:
   at a source node, distributing and mapping all the data packets forming an original data flow to be forwarded to multiple Label Switching Paths (LSPs) for forwarding, inserting a detection message into the original data flow to be forwarded according to a set period, and when information of an invalid LSP is received from a destination node, stop distributing the data packets to the invalid LSP;
   at the destination node, receiving the detection message from each of the LSPs according to the set period, when the detection message is found lost, deciding that the LSP becomes invalid, sending the information of the invalid LSP to the source node, stopping receiving the data packets from the invalid LSP, and merging the data packets received from all the LSPs into the same data flow as the original data flow forwarded;
   at the source node, adding a sequence number to each data packet forming the original data flow to be forwarded according to the forwarding order before mapping the data packets to the LSPs,
   wherein merging the data packets comprises,
      merging the data packets received from the LSPs in the order of the sequence numbers,
      removing the sequence numbers of the merged data packets, and
      obtaining the same data flow as the original one to be forwarded,
   wherein adding the sequence number comprises the sequence number to be added to the data packet being increased according to the transmitting order; and
   when the sequence number of the data packet to be merged into the data flow is a variable and when the initial value of the variable is the starting value of the sequence numbers added to the data packets to be forwarded at the source node, implementing the data packet receiving and merging the received data packets by b1) deciding whether there is a sequence number equal to the value of the variable among the sequence numbers of the data packets outputted from the LSPs through a Round Robin mode of all the valid LSPs, if yes, proceeding to b2; otherwise, proceeding to b3;

b2) merging the data packet corresponding to the sequence number to a data packet sequence, increasing the variable by one, and proceeding to b1;

b3) deciding whether there is, among all the valid LSPs in the Round Robin mode, an LSP that outputs no data packets, if there is, proceeding to b1; otherwise, proceeding to b4; and b4) merging the data packet that has the minimum sequence number among the data packets outputted from all the valid LSPs in the Round Robin mode to the data packet sequence, making the variable equal to the minimum sequence number plus one, and then proceeding to b1.

2. The method according to claim 1, wherein mapping the data packets to the LSPs for forwarding comprises:
   a1 determining the current data packet to be forwarded according to a First In First Out (FIFO) principle, and selecting one LSP through a Round Robin mode of all the valid LSPs;
   a2 deciding whether it is allowed to send a data packet via a buffer of the selected LSP, if yes, proceeding to a3; if not, proceeding to a4;
   a3 mapping the data packet to the LSP for forwarding, and proceeding to a1; and
   a4 selecting the next LSP by the Round Robin mode, and proceeding to a2.

3. The method according to claim 1, wherein merging the data packet that has the minimum sequence number among the data packets outputted from all the valid LSPs in the Round Robin mode to the data packet sequence comprises:
   b41) selecting two LSPs randomly from all the valid LSPs;
   b42) comparing the sequence numbers of the output data packets of the two LSPs and selecting the minimum number, deciding whether there is unselected LSP left, if there is, proceeding to b43; otherwise, proceeding to b44;
   b43) randomly selecting one from the remaining LSPs, comparing the minimum number with the sequence number of the output data packet of the selected LSP, selecting the minimum number of these two and deciding whether there is unselected LSP left, if there is, proceeding to b43; otherwise, proceeding to b44; and
   b44) merging the data packet corresponding to the minimum number obtained finally to the data packet sequence.

4. The method according to claim 3, wherein when the binary digits of the sequence number of the data packet sent at the source node is n, the maximum time delay of all the valid LSPs converted to a number of the data packets is $\Delta D$, the maximum continuous packet loss allowed in one working LSP of all the valid LSPs is $\Delta L$, and the sequence numbers of the data packets received from the two LSPs at the destination node are variables x and y, respectively, $\Delta D + \Delta L = |x-y| \leq 2^{n-1}$, selecting the minimum value comprises:
   c1) deciding whether $|x-y| \leq 2^{n-1}$, if yes, proceeding to c2; otherwise, proceeding to c4;
   c2) deciding whether $|x-y| \leq \Delta D + \Delta L$, if yes, proceeding to c3; otherwise, proceeding to c6;
   c3) outputting the minimum of x and y, and completing the comparison of pairs of values;
   c4) deciding whether $|x-y| > 2^n - (\Delta D + \Delta L)$, if yes, proceeding to c5; otherwise, proceeding to c6;

c5) outputting the maximum of x and y, and completing the comparison of pairs of values; and c6) generating an alarm signal.

5. A data forwarding system in label switching networks, comprising at least a service bearer logical layer, which comprises at least a source node and a destination node, and a basic network layer, which comprises multiple label switching path(LSP), wherein the source node is configured to add a sequence number to each of the data packets forming an original data flow to be forwarded according to a forwarding order and to map the data packets to more than one valid LSPs, the source node comprises an adaptation module, a distribution module, multiple labeling modules and multiple network layer processing modules corresponding to each of the LSPs of the basic network layer, respectively, the adaptation module is used to add sequence numbers to the data packets forming one data flow according to the forwarding order and to forward the sequence-number-added data packets to the distribution module, the distribution module is used to distribute the received data packets to the labeling modules, the labeling module is used to add labels to the received data packets, and to forward the label-added data packets to the network layer processing module, and the network layer processing module is used to map the data packets to the basic network layer for forwarding, the destination node is configured to merge the data packets received from each of the valid LSPs according to the order of the sequence numbers, and to remove the sequence numbers of the merged data packets to obtain the same data flow as the original data flow forwarded, the destination node comprises network layer processing modules and de-labeling modules corresponding to each of the LSPs in the basic network layer, as well as a de-adaptation module and a merging module, the network layer processing module is used to de-map the data packets received from the basic network layer, and then forward the packets to the de-labeling module, the de-labeling module is used to remove the labels from the received data packets, the merging module is used to merge the data packets received from each de-labeling module to a data packet sequence according to the order of the sequence numbers, and the de-adaptation module is used to remove the sequence numbers from the data packet sequence after merging and to obtain the same data flow as the original data flow forwarded.

6. The system according to claim 5, wherein the basic network layer comprises at least one return path;

the source node further comprises operation administration modules (OAM), each of which is connected to the labeling module and used to insert a detection message to the data flow in the labeling module according to a set period, and after receiving an LSP failure indication sent from the destination node through the return path, to forward the failure indication to the distribution module;

the distribution module is used to stop distributing the data packets to the corresponding labeling module upon receiving the LSP failure indication sent by the OAM;

the destination node further comprises OAMs as well, each of which is connected to a de-labeling module and is used to receive the detection message from the de-labeling module according to the set period, and to send the failure indication to the OAM of the source node through the return path when no detection message is received in the set period, and to send a notice to the merging module; and the merging module is used to stop receiving the data packets from the LSP upon receiving the notice sent by the OAM.

* * * * *